United States Patent [19]

Bryan, III et al.

[11] Patent Number: 5,331,994
[45] Date of Patent: Jul. 26, 1994

[54] FUEL ADDITIVE DISPENSING SYSTEM

[76] Inventors: John F. Bryan, III, 561 N. 64th St., Wawatosa, Wis. 53213; Brian W. Petersen, 1504 North Jackson, Milwaukee, Wis. 53202; Harley B. Martin, Rte. 2 Box 209B, Aliceville, Ala. 35442

[21] Appl. No.: 128,323

[22] Filed: Sep. 29, 1993

Related U.S. Application Data

[63] Continuation of Ser. No. 46,453, Apr. 13, 1993, abandoned.

[51] Int. Cl.⁵ .............................................. F02B 75/12
[52] U.S. Cl. ...................................... 137/1; 123/1 A; 137/101.25; 137/558; 222/56
[58] Field of Search ............... 137/1, 101.25, 558; 222/56; 123/1 A, 198 A

[56] References Cited

U.S. PATENT DOCUMENTS

| | | | |
|---|---|---|---|
| 4,253,436 | 3/1981 | Dudrey | 123/1 A X |
| 4,596,277 | 6/1986 | Djordjevic | 123/1 A X |
| 4,621,593 | 11/1986 | Rao | 123/1 A |
| 5,195,466 | 3/1993 | Schulte | 123/1 A |

Primary Examiner—Robert G. Nilson
Attorney, Agent, or Firm—John F. Bryan, Jr.

[57] ABSTRACT

An additive dispensing system for diesel fueled applications includes a diesel fuel system having either single or multiple tanks, a fuel level sensor, an additive tank, a fixed rate additive dispensing pump and a microprocessor operating on a logic basis whereby a minimum of three fuel level readings, taken at fixed periods and compared to one another and/or to predetermined standards, provide the input necessary to control the operation of the additive dispensing pump so as to maintain a predetermined concentration of additive in the diesel fuel system regardless of random refueling sequences.

14 Claims, 9 Drawing Sheets

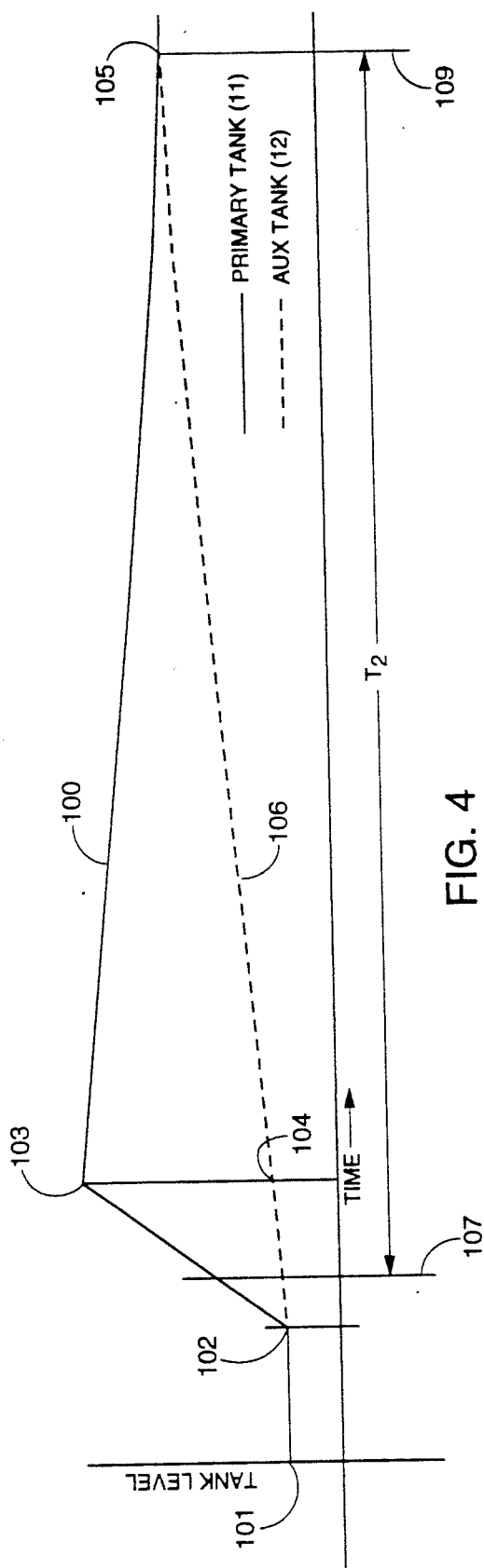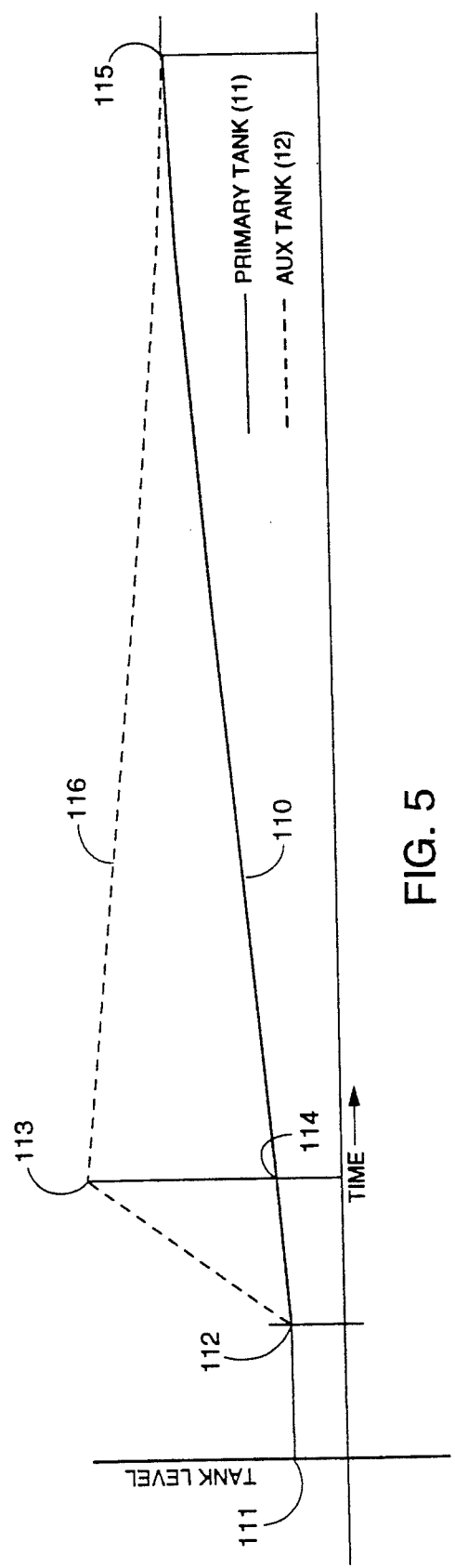

FUEL ADDITIVE DISPENSING SYSTEM

This is a continuation of copending application Ser. No. 08/046,453 filed on Apr. 13, 1993, now abandoned.

TECHNICAL FIELD

This invention relates to apparatus for automatically metering appropriate quantities of an additive to a working supply of diesel fuel which is replenished in unpredictable amounts at random intervals, so as to maintain an accurately controlled additive concentration in the diesel fuel.

BACKGROUND AND SUMMARY OF THE INVENTION

Fuel treatment additives have been developed in recent years which modify diesel fuels to prevent freezing and to improve efficiency, power and environmental characteristics. Usually, such additives are mixed with the fuel in a ratio of approximately one part per thousand or less, perhaps as little as one part in ten thousand. For example, additives made by Parrish Chemical Company of Provo, Utah, and distributed under the trade names FERROX and FPC-1 are catalytic agents which, in concentrations of as little as one part in 5,000, improve combustion efficiency and reduce particulate carbon exhaust emissions. While higher concentrations are tolerable, little benefit is gained. Since all such additives are relatively expensive, It is desirable to maintain a mixture concentration scarcely greater than the effective minimum.

In the most basic method of application, the fuel treatment is dispensed manually by simply measuring out an appropriate quantity of additive for the desired concentration and pouring it into the tank. This works particularly well in a fixed base operation where tankage is maintained for fueling a number of locally operated vehicles and supervision is close at hand. Vehicle operators not having such supply systems, and long haul operators, must treat their fuel at each refueling stop. Additives are highly concentrated and generally disagreeable or even dangerous to handle. Inclement weather, urgent schedules, human error and careless neglect also conspire against the efficacy of manual dispensing procedures. The benefits of a consistent fuel treatment program are compelling however, and various means have been evolved in an attempt to resolve the implementation problem. Among these is Dudrey, who in his U.S. Pat. No. 4,253,436, has disclosed a manually controlled system wherein, after refueling, the operator makes a control panel input of the fuel quantity added to initiate an electrically operated synthesis of the manual procedure. After the fuel quantity is entered, a dispensing pump is caused to run for the period of time needed to inject an appropriate amount of additive separately into each fuel tank. The human problems of error and careless neglect, according to the teaching of Dudrey, are addressed only through "later checking by supervisory personnel for determining that the operator/driver caused the liquid additive to be added to the vehicle fuel."

As a general rule, diesel trucks have saddle tanks on either side, interconnected with a tank level balance line. The tanks have separate fillers, since the cross-flow capacity of the balance line is much less than the refueling rate. Usually only the tank on the driver's side has a fuel level gauge sensor and, as fuel is used, the balance line distributes the remaining fuel equally between tanks. Modest errors in the fuel level may be sensed when driven or parked on sloping terrain, but normally such slopes do not exceed 1:20 and the sensor is located more or less centrally in the tank so that such errors are not of significant magnitude. The single tank sensor is unreliable only during refueling, when one side or the other is being filled rapidly. Another potential source of sensor error is wave action or sloshing of the fuel. To minimize this effect, the fuel tanks are baffled and the gauge circuit is electrically damped to further stabilize the indicated fuel level.

U.S. Pat. No. 4,621,593 by Rao, et al, discloses a system for dispensing an exhaust deposit treatment additive by an automatic cycle, initiated by the removal of the fuel filler cap and shut down by replacement of the cap. The change in resistance of a fuel level sensor is used to compute the number of pulses of a diaphragm type pump needed to dispense additive for treatment of the added fuel. The accuracy of the computed pulse count is dependent upon the accuracy of "snapshot" fuel level gauge readings and may be adversely affected by wave action or other transient anomalies. In inclement weather, the driver may elect to fill only one saddle tank, on the sheltered side of the truck, causing a major gauge errors until the balance line has time to equalize tank levels. To cope with such inaccuracies, the system must be calibrated to supply a quantity of additive well in excess of the ideal minimum. Additionally, a fuel cap switch or any such mechanical interface device can be unreliable, particularly with field installation of a kit.

Similar single tank and multiple tank refueling sequences are practiced when diesel fuels are used in stationary power, maritime power and industrial heating applications.

A primary object of the present invention is therefore, to provide a fully automatic fuel additive dispensing system which performs without supervision. A second object is to provide such a system capable of compensating for the human and physical variables of refueling, so as to accurately maintain a predetermined minimum additive concentration. A third object is to provide an additive dispensing system as a universally applicable unit, requiring only electrical and fluid connections for installation.

The present invention accomplishes these objectives with a system comprising the existing fuel tank and fuel level sensor, an additive tank, a fixed delivery rate additive transfer plump and a microprocessor programmed for fuel level and rate-of-change logic. The additive pump cycle is controlled by the microprocessor according to the fuel level logic. Fuel level is read on a continuing schedule at fixed "point-in-time" intervals, with the accuracy of each such point-in-time reading preferably being enhanced by averaging several readings taken during a brief period. Then, the micro-processor is programmed to compare consecutive point-in-time readings, evaluate change and rate of change of the fuel level to identify the beginning and end of a refueling event, and to initiate an appropriate additive dispensing sequence.

DESCRIPTION OF THE DRAWINGS

The aforementioned and other objects and features of the invention will be apparent from the following detailed description of specific embodiments thereof, when read in conjunction with the accompanying drawings, in which:

FIG. 4 is the "Fuel Level vs. Time" curve for the primary fuel tank showing the level change while refueling the primary tank only;

FIG. 5 is the "Fuel Level vs. Time" curve for the primary fuel tank showing the level change while refueling the auxiliary tank only;

DETAILED DESCRIPTION OF THE INVENTION

Figure 1:
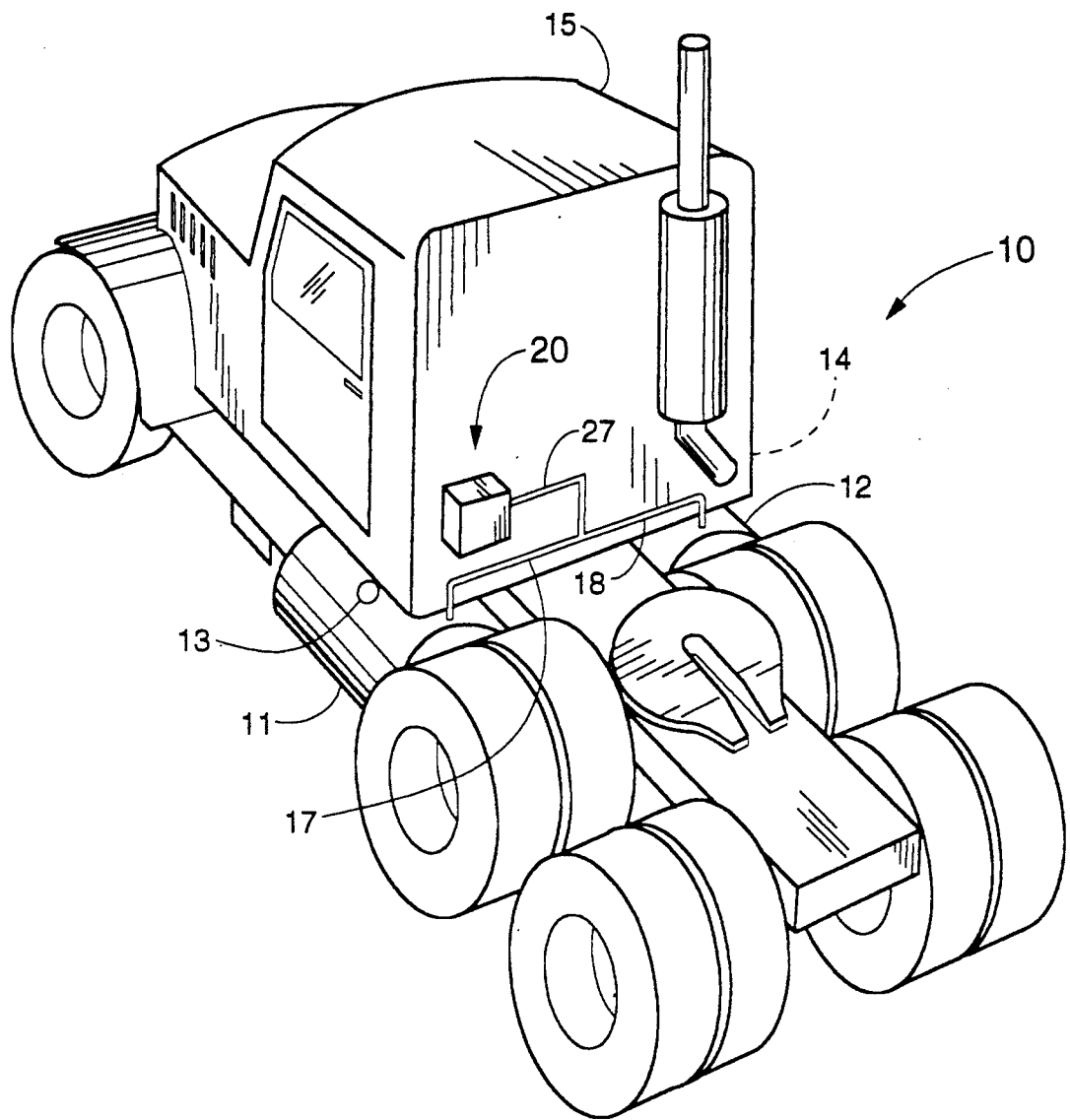
FIG. 1 shows a diesel powered tractor truck of the type using a preferred embodiment of the present invention.

In FIG. 1 is a view of a diesel tractor truck 10, conventionally used in conjunction with a semi-trailer for hauling over-the-road freight. Primary fuel tank 11 is located on the driver's or left hand side with an auxiliary tank 12 located on the right side. These are referred to as "saddle tanks" when mounted in such an arrangement. Removable filler cap 13 is seen to be provided in primary tank 12 for refueling purposes, and a second removable filler cap 14 is similarly provided for auxiliary tank 12. The preferred embodiment of the present invention has the additive dispensing unit 20 mounted on the rear of the cab 15 of truck 10 with additive transfer line 27 connected to primary tank 11 and auxiliary tank 12 by lines 17 and 18 respectively.

Figure 2:
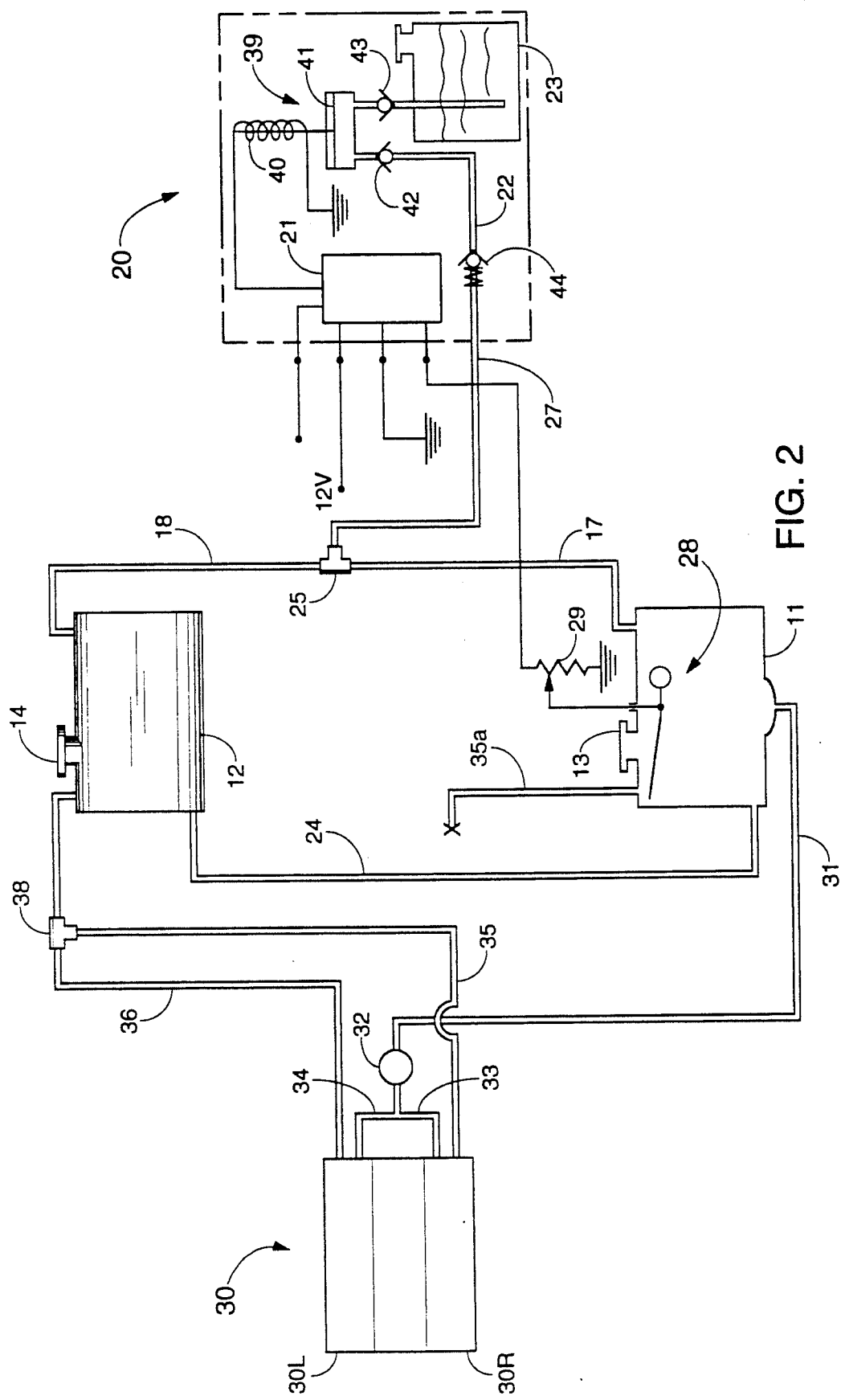
FIG. 2 is a schematic diagram of the fuel system of the truck of FIG. 1.

The schematic diagram of FIG. 2 shows the installation of the preferred embodiment 20 in the conventional fuel system of truck 10. Primary tank 11 and auxiliary tank 12 are shown with removable caps 13 and 14 respectively. Fuel level sensing unit 28 is mounted in primary tank 11 and engine fuel pump 32 draws fuel from this tank through fuel suction line 31. Engine 30, is shown as as a "Vee" type, having two cylinder banks, although an in-line engine might also be used. Fuel is supplied to cylinder banks 30L and 30R through fuel supply lines 33 and 34 by fuel pump 32. Vee type engines frequently return excess fuel from the right and left cylinder banks to the right and left tanks respectively. The blocked left bank excess fuel return line 35a represents such a system which has been modified by rerouting return line 35 to the connecting Tee 38 installed in excess fuel return line return line 36 to combine the return flow from cylinder banks 30L and 30R. This modification is not essential but, in conjunction with tank level balance line 24, serves to bring the additive concentration in both tanks into true equilibrium more rapidly.

Additive transfer pump 39 is seen to comprise solenoid 40, reciprocating diaphragm 41 and inlet and outlet flow check valves 43 and 42 respectively. As reciprocating diaphragm 41 cycles, additive is moved from additive tank 23 and displaced into pump output line 22 under sufficient pressure to open spring seated flow check valve 44 which serves to prevent drainage of additive tank 23 through an idle transfer pump 39. A solenoid operated valve would serve the same function. Additive passing through check valve 44 flows through transfer line 27 to "Tee" connection 25 and the to tanks 11 and 12 via lines 17 and 18 respectively. The additive concentration obtained in each tank from this initial distribution is not necessarily uniform but is soon blended by flow through excess fuel return lines 35, 36 and tank level balance line 24.

Fuel level sensing unit 28 signals changes of fuel level in tank 11 by proportional changes in the value of resistance 29 as seen by microprocessor 21. The microprocessor of the preferred embodiment switches off the fuel gauge connection to resistance 29 in order to accurately measure this value and, during the brief switching period, the fuel level gauge may be stabilized by a buffer circuit to avoid erratic gauge indications. The value of resistance 29 is calibrated in terms of the ratio of fuel in the primary tank relative to a full condition and reasonable care must be taken to minimize error in the fuel level so determined. In order to establish a reference level for refueling quantity, the "point-in-time" value corresponding to the lowest fuel level sensed is saved in the memory of microprocessor 21. Successive "point-in-time" measurements are evaluated and when a predetermined change in fuel level takes place, as is later discussed, microprocessor 21 recognizes the event as a refueling-in-process condition. The fuel level change is evaluated in terms of magnitude, or rate of change, to implement this recognition. Additive transfer pump 39 is then operated for a period of time calculated to dispense the quantity of additive required for the amount of fuel added.

Figure 3:
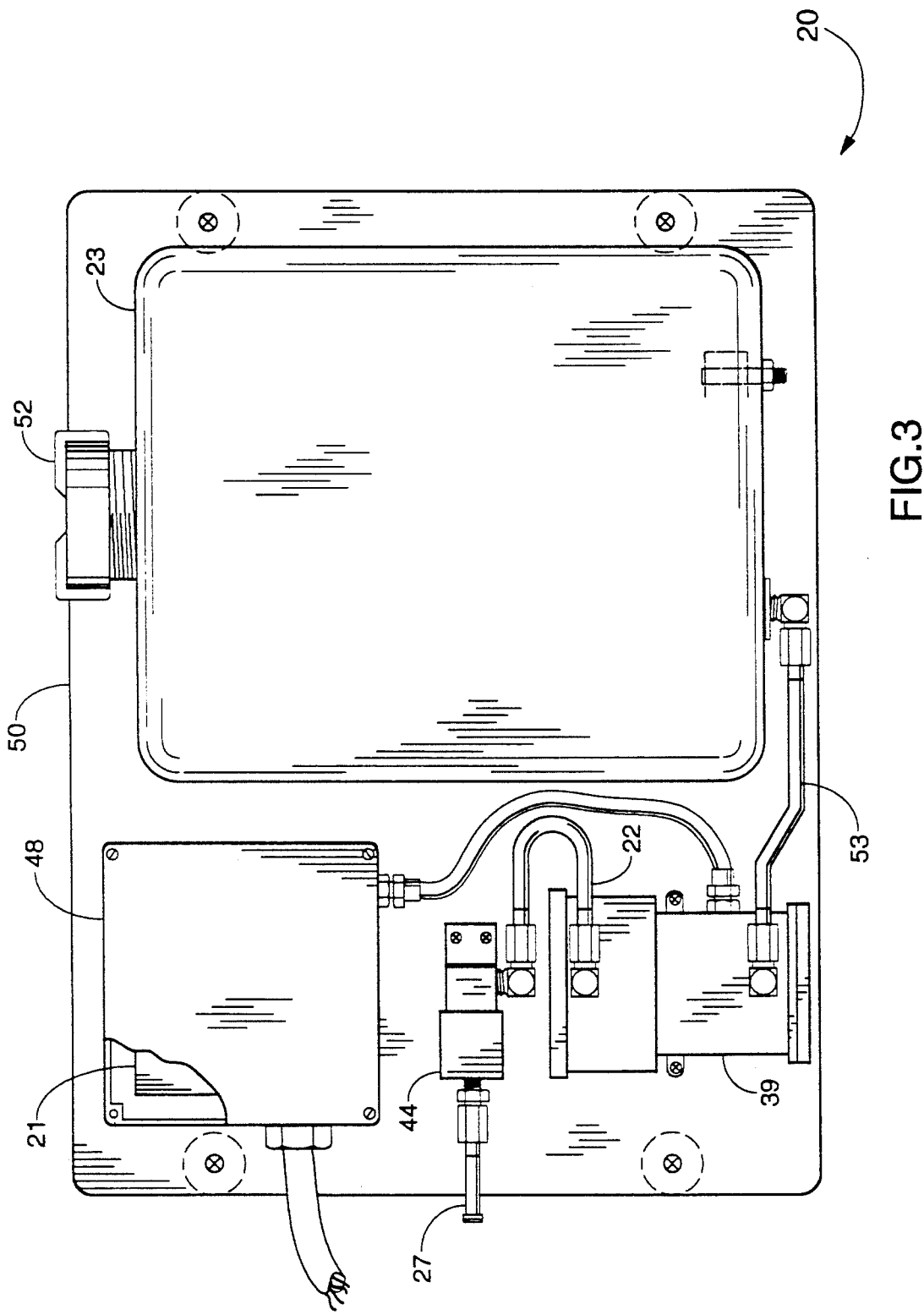
FIG. 3 shows an assembly of the components of a preferred embodiment of the present invention.

FIG. 3 shows the assembly of the additive dispensing unit 20 wherein additive tank 23 is mounted on base plate 50 and is filled by means of removable cap 52. Tank outlet line 53 supplies additive transfer pump 39 and pump output line 22 connects the additive flow to check valve 44 which prevents leakage when unit 20 is idle. Additive transfer line 27 carries the additive to the fuel system as previously shown. Microprocessor 21 inside of protective housing 48 controls the operation of dispensing unit 20 by means of the logic methods later described.

FIGS. 4-7 are presented to show the possible refueling procedures which an operator of a truck with saddle tanks might follow. In refueling, the rate of fuel delivery varies between 10 and 50 or more gallons/minute, according to the filling station pump capacity. The cross-flow capacity of tank level balance line 24 is 0–6 gpm, depending upon line size and imbalance pressure head. With this frame of reference, FIG. 4 shows the level sensed in the primary tank during a refueling procedure wherein fuel is added only to the primary tank. Solid line 100, beginning with point 101, indicates the level sensed, with the refueling starting at point 102. Both the primary tank 11 and the auxiliary tank 12 are at the same level at point 102 and, as fuel is added, the level in primary tank 11 increases rapidly. This rate of increase is established by the fuel delivery pump and diminished somewhat by cross-flow through tank level balance 24. The slower rate of fuel level increase in auxiliary tank 12 is shown by broken line 106. As the difference in tank level increases, the rate of cross-flow increases proportionately, reaching its maximum at point 104 when primary tank 11 is filled as indicated at point 103. Cross-flow rate decreases as the difference in tank levels decreases, shown in the flattening slope of solid line 100 and broken line 106 as a balanced tank level condition is approached at point 105. The period "$T_2$" indicated by reference times 107 and 109 relates to the program logic of FIG. 10.

FIG. 5 shows the companion situation to that of FIG. 4, wherein the auxiliary tank 12 is fueled, and none added to primary tank 11. Solid line 110, beginning with point 111, indicates the level sensed, with the refueling starting at point 112. Both the primary tank 11 and the auxiliary tank 12 are at the same level at point 112 and, as fuel is added, the level in auxiliary tank 12, shown by broken line 116, increases rapidly. As in FIG. 4, this increase is at the rate of the fuel delivery pump, diminished somewhat by cross-flow through tank level balance 24. The slower rate of fuel level increase in primary tank 11 is shown by solid line 110. As the difference in tank level increases, the rate of cross-flow increases proportionately, reaching its maximum at point 114 when auxiliary tank 12 is filled, as indicated by point 113. Cross-flow rate decreases as the difference in tank levels decreases, as is shown in the flattening slope of solid line 110 and broken line 116 as the balanced tank level condition is approached at point 115.

Figure 6:
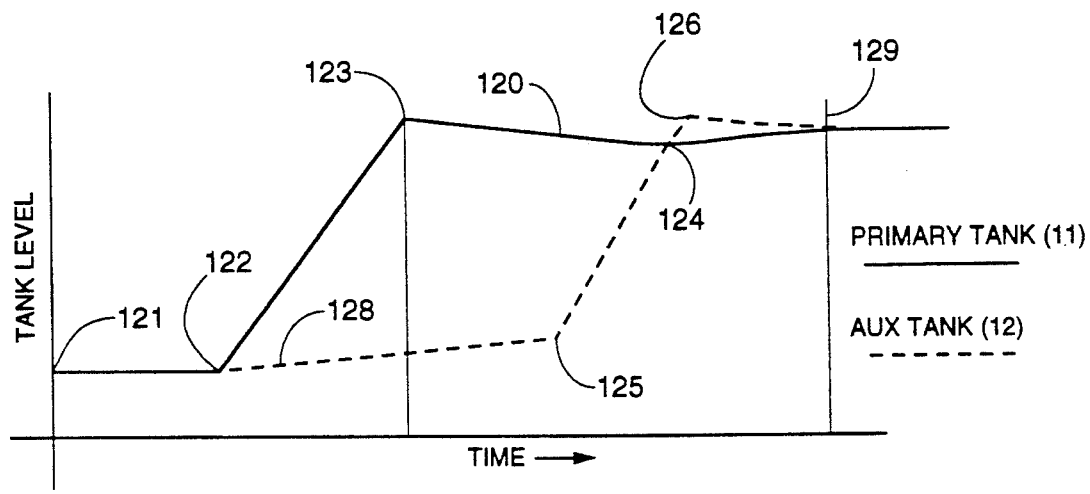
FIG. 6 is the "Fuel Level vs. Time" curve for the primary fuel tank showing the level change while refueling the primary and auxiliary tanks in that order.

In FIG. 6, primary tank 11 and auxiliary tank 12 are shown to be filled in turn as seen by solid line 120 and broken line 128 respectively. Primary tank 11 contains a nominal quantity of fuel at point 121, and the beginning of fuel delivery is at point 122. The increasing fuel level indicated by solid line 120 is the rate of fuel delivery, diminished somewhat by cross-flow through tank level balance line 24 to auxiliary tank 12. The rate of this cross-flow increases as the difference in tank levels increases, shown by broken line 128. Point 123 indicates the completion of delivery to primary tank 11 and point 125 indicates the beginning of fuel delivery to auxiliary tank 12. Point 126 indicates completion of this phase of the refueling operation. The rate of increase of fuel level in auxiliary tank 12 is greatest when the difference between tank levels is greatest and, is gradually reduced as the levels become equal at point 124. It is also seen that the rate of change of the level curve of primary tank 11 (solid line 120) is zero at point 124. The levels in primary tank 11 and auxiliary tank 12 equalize as is shown between points 126 and 129 and between points 124 and 129. Thus, the rate of equalizing cross-flow is seen to approach zero as the tank level difference approaches zero.

Figure 7:
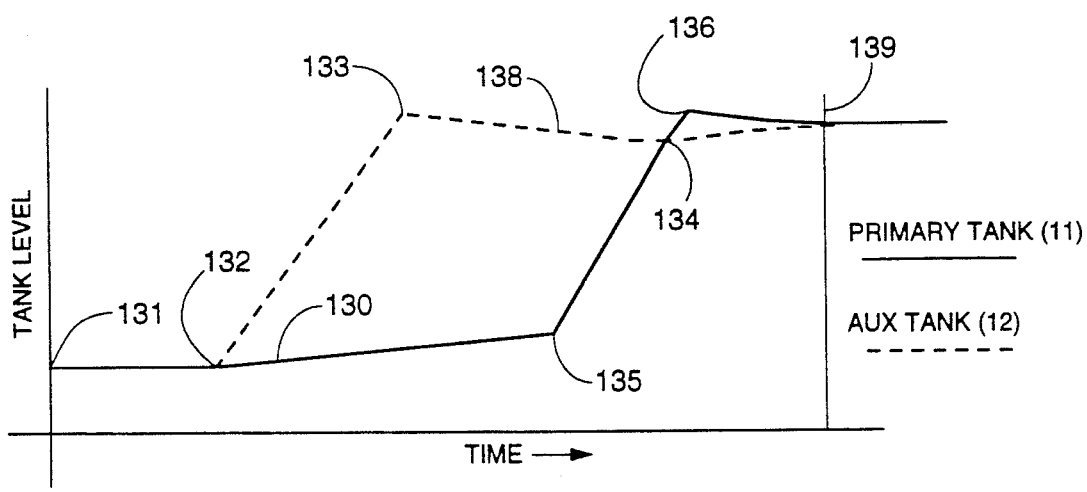
FIG. 7 is the "Fuel Level vs. Time" curve for the primary fuel tank showing the level change while refueling the auxiliary and primary tanks in that order.

In FIG. 7, auxiliary tank 12 and primary tank 11 are filled in that order as shown by broken line 138 and solid line 130 respectively. Primary tank 11 contains a nominal quantity of fuel at point 131. The beginning of fuel delivery to auxiliary tank 12 is at point 132 and completion is at point 133. The increasing fuel level indicated by broken line 138 is at the rate of delivery, diminished somewhat by cross-flow through tank level balance line 24 to primary tank 11. The rate of this cross-flow increases as the difference in tank levels increases as is shown by solid line 130. Point 135 indicates the beginning of fuel delivery to primary tank 11, and point 136 indicates completion of this phase of the refueling operation. The rate of increase of fuel level in primary tank 11 is greatest when the difference between tank levels is greatest and, is gradually reduced as the levels become equal at point 134. It is also seen that the rate of change of the level curve of auxiliary tank 12 (broken line 138) is zero at point 134. The levels in auxiliary tank 12 and primary tank 11 equalize as is shown between points 136 and 139 and between points 134 and 139. It is again noted that the rate of equalizing cross-flow approaches zero as the tank level difference approaches zero.

Changing fuel level and its rate of change are thus, the logic elements which enable the recognition of beginning and completion of a refueling event and thereby, accurate control of the amount of additive dispensed.

Figure 8:
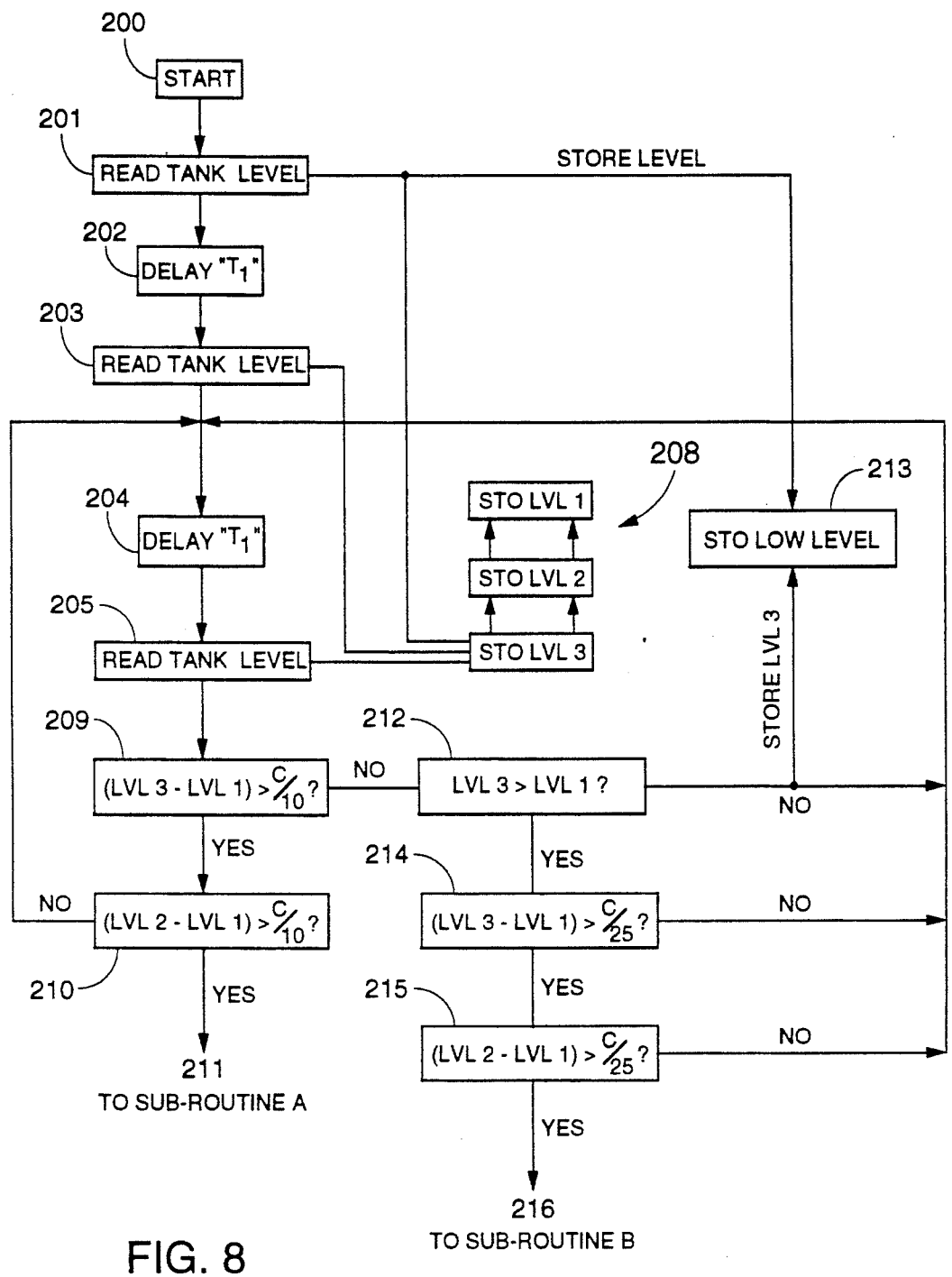
FIG. 8 is a diagram of a preferred microprocessor logic method for recognizing a refueling event for any tank arrangement.

FIG. 8 shows a preferred microprocessor program logic method for recognizing a refueling event for any tank arrangement. This preferred "master" logic is applicable to single tank or to multiple, interconnected tank arrangements, irrespective of which tank is first served. The dispensing system my be powered up by the unit ignition switch or may be wired direct so that it runs continuously but, in either case, the program begins at "Start" 200 with an immediate "Read Tank Level" 201 which is then stored as "Low Level" 213 and in memory register stack 208 as "Level 3".

After "Delay $T_1$" 202, a period of time ranging from perhaps 1 minute to 10 minutes or more, according to the application, a second "Read Tank Level" 203 is preformed and this reading is also stored in register stack 208 as "Level 3", moving the first stored reading to "Level 2". A second "Delay $T_1$" 204 and a third "Read Tank Level" 205, similarly stored as "Level 3" with the prior "Level 3" and "Level 2" moving to "Level 2" and "Level 1" respectively. Thus, a continuing three point plot of "Fuel Level vs. Time" is made available for evaluating changes of tank level with respect to time for indications of a refueling sequence.

Fuel level readings are taken as decimal fractions of the full tank indication rather than as volumetric units. Assuming a total fuel tank capacity of 300 gallons and an arbitrary period of 3 minutes is for T1, the minimal delivery pump rate of 10 gpm in that time is the equivalent of 1/10 of the total tank capacity or C/10. In this frame of reference, a level change of C/25 is well under a maximum balance line flow rate of 5 gpm for the same fuel tank arrangement and a level change of C/50, in proper context, indicates nearing of a balanced cross-level condition. In consideration of these relationships, "Level 3" minus "Level 1" is compared to C/10 at 209. An increase greater than C/10 at 209 indicates a possible refuelling and then "Level 2" minus "Level 1" is compared to C/10 at 210. YES at 210 affirms the probability of a direct refueling sequence per FIGS. 4 or 6 and "Sub-routine A" is initiated per FIG. 9(a). If, however, the result at 209 is negative, a further query at 212 is made to see that "Level 1" is not less than "Level 3". This is expected to be the case between refuelings and if so, "Level 3" is stored as the new "Low Level" in storage register 213 and the program then loops back to "Delay $T_1$" at 204. If "Level 3" is found to be greater than "Level 1" the change between "Level 2" and "Level 1" and the change between "Level 3" and "Level 2" are compared to C/25 at 214 and 215. If both exceed C/25, the probability of an indirect refueling sequence per FIGS. 5 or 7 is affirmed and "Sub-routine B" is initiated per FIG. 9(b). If either 214 or 215 yields a NO, it is assumed that the level increase sensed at 212 was a transient event, not related to refueling, and the program loops back to "Delay $T_1$" at 204.

Figure 9A:
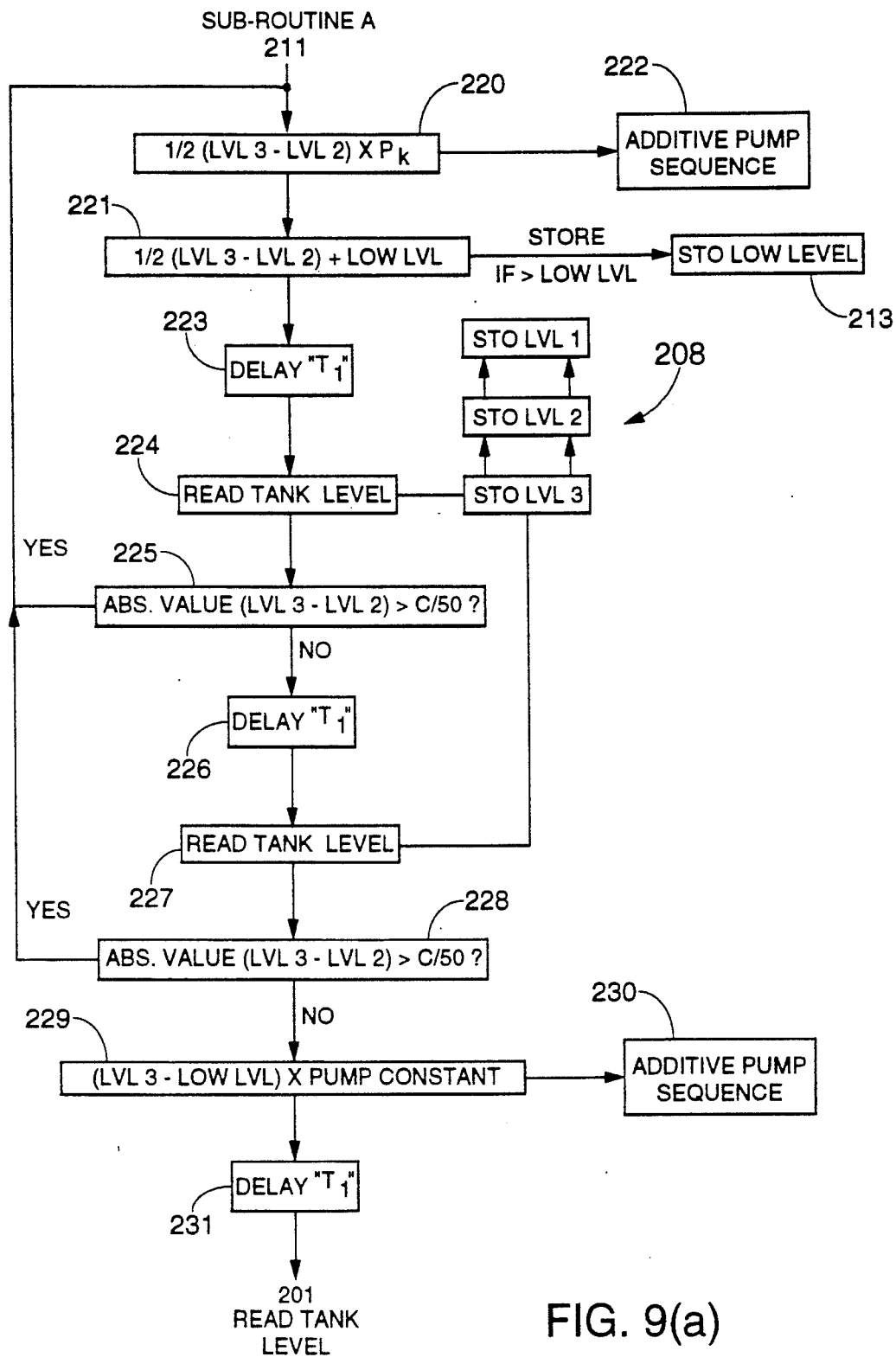
FIGS. 9a and 9b are diagrams of preferred microprocessor logic methods for enabling an additive dispensing sequence.

FIG. 9(a) shows "Sub-routine A", starting with computation 220 of an additive pump cycle 222. An additive pump constant $P_k$ is derived as a factor for conversion of an amount of fuel added to a corresponding running time for the fixed displacement additive pump 39 which will deliver the appropriate additive quantity. Computation 220 divides the level increase by two and multiplies the result by the additive pump constant $P_k$ so that a false, apparent level, taken before complete tank balancing, can not cause an oversupply of additive. A revised effective low level is established by computation 221 and stored in storage register 213 if it is greater. After another "Delay $T_1$" period 223 the result of "Read Tank Level" 224 is stored as "Level 3", resetting storage register 208 as previously described. This most recent "Level 3" is evaluated in the computation 225 to see if the absolute value of the indicated change of level is more (YES) or less (NO) than C/50, as would indicate the approach of a balanced cross-level condition. If YES, the sub-routine loops back to 220 and if NO it advances to another "Delay $T_1$" 226 after which the result of "Read Tank Level" 227 is stored as "Level 3", again resetting storage register 208. In order to be certain that the balanced condition is indeed imminent, the newly revised "Level 3" is tested again in computation 228 as previously in 225. If the absolute value of the level change exceeds C/50 (YES), the sub-routine loops back to 220 and, if it does not, it advances to computation 229 where the instant "Level 3" is compared to the effective low level now stored in register 213 for control of the final additive dispensing sequence 230. "Delay $T_1$" 231 then completes "Sub-routine A" and the program loops back to the base program at "Read Tank Level" 201.

Figure 9B:
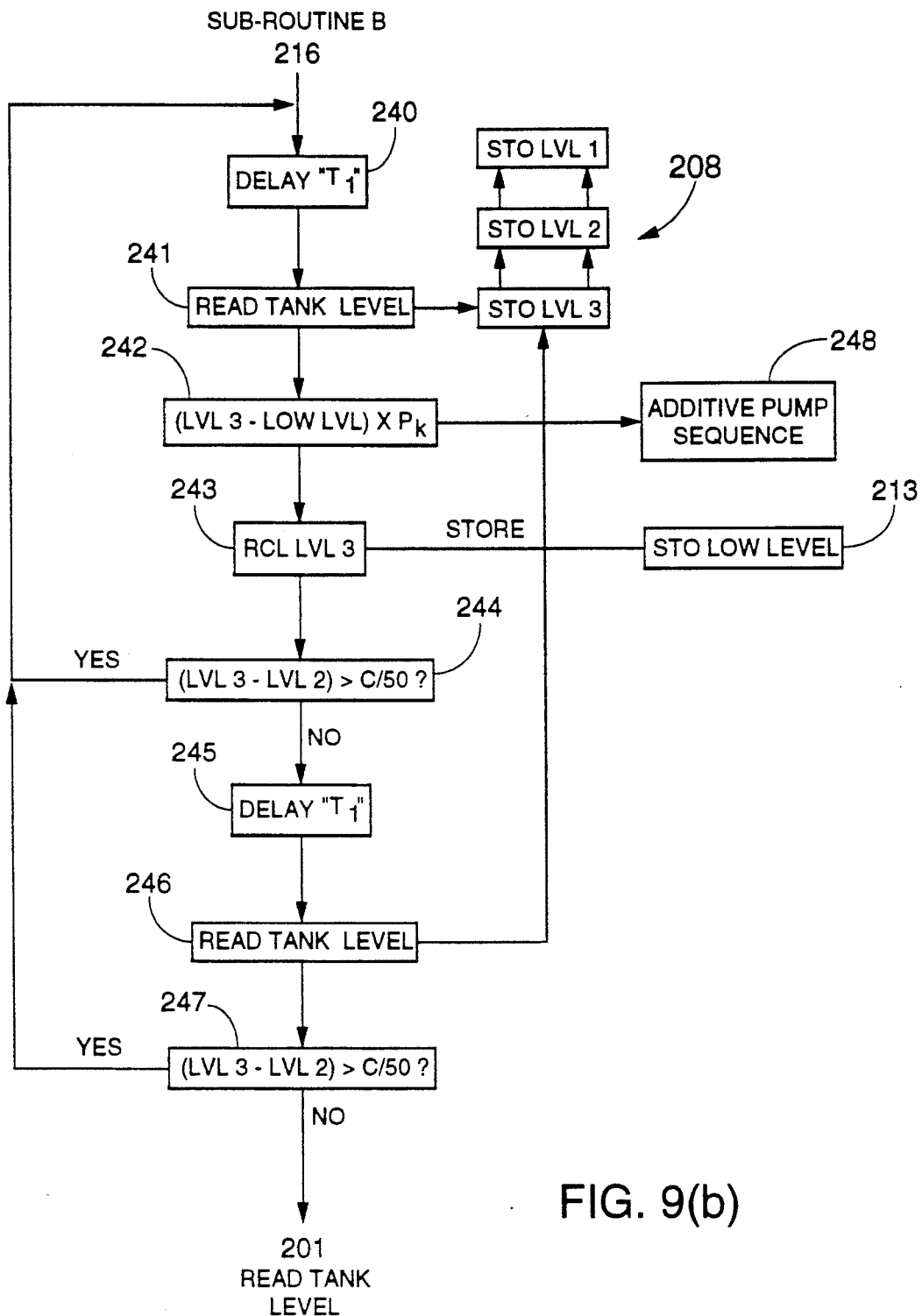

FIG. 9(b) shows "Sub-routine B", starting at 216 with "Delay $T_1$" 240 and continuing with "Read Tank Level" 241, which is stored as "Level 3". The level stored in "Low Level" 213 is then deducted from "Level 3" in register 208 and multiplied by the pump constant Pk in computation 242 to control "Additive Pump Sequence" 248. "Level 3" is then stored in "Low Level" register 213 to be available if needed for another sequence. The tank level trend is tested in computation 244 and if the last increase was greater than C/50 (YES), the routine loops back to "Delay $T_1$" 240 for another round. If less (NO), the routine continues with a repeated trend test 247 by way of "Delay $T_1$" 245 and "Read Tank Level" 246 for positive verification before returning to the base program at "Read Tank Level" 201.

It is to be understood that the value assigned to "Delay $T_1$" is not critical to maintaining a desired additive concentration. As these periods are extended, the program moves away from "Sub-routine B" to work in "Sub-routine A", and ultimately in "Sub-routine A" exclusively, with correspondingly less frequent additive pump sequences. The only detrimental consideration is that also, a longer time is needed to reach a targeted concentration. This may, or may not, be critical, depending upon the specific application.

Figure 10:
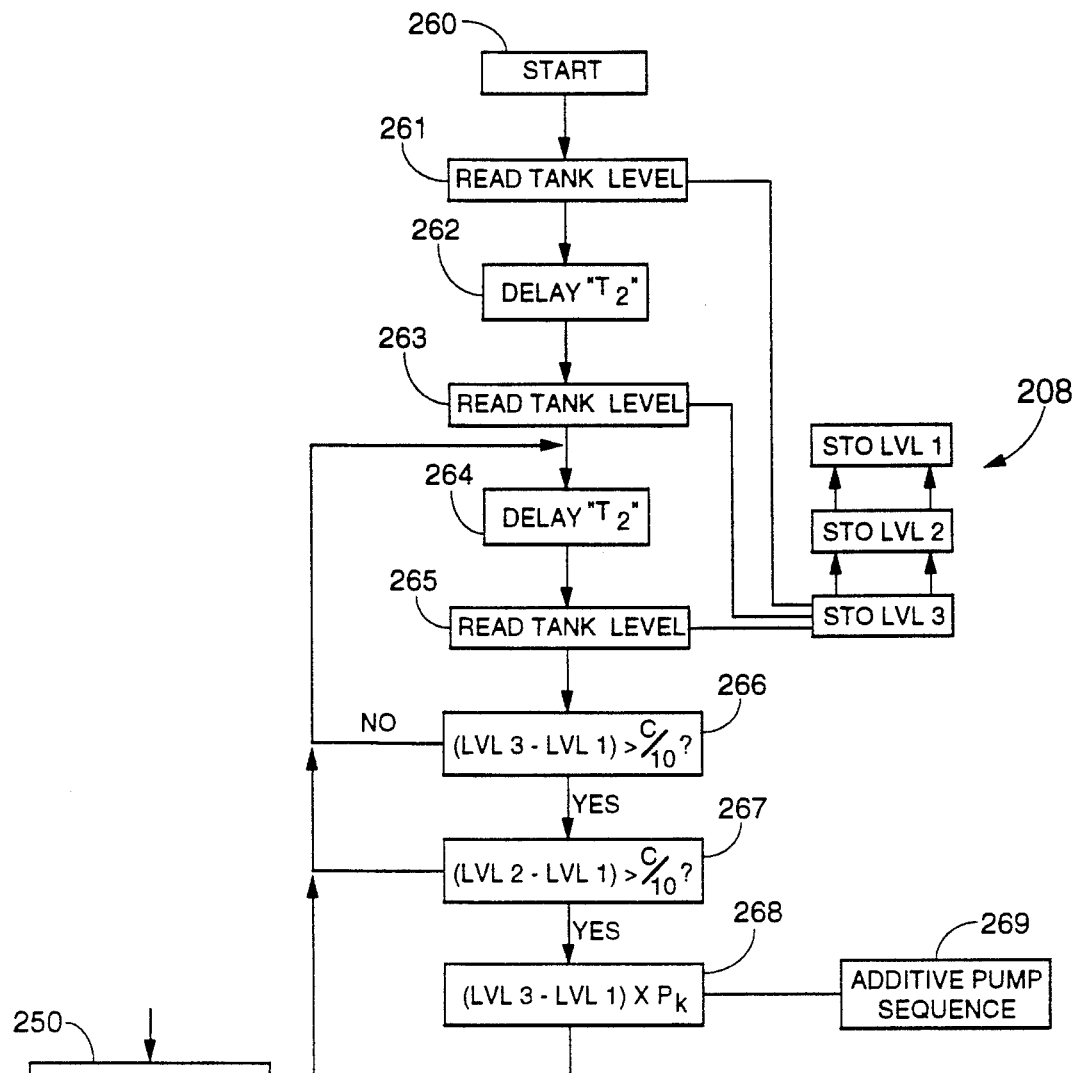
FIG. 10 is an alternate microprocessor logic method for recognizing a refueling event and implementing an additive sequence.

FIG. 10 shows a second preferred microprocessor logic method specifically adapted to greatly extended "Delay $T_1$" periods, made to equal or exceed the greatest time anticipated for completion of refueling and tank balancing. This scenario is illustrated in FIG. 4 where "$T_2$" is designated as an arbitrary period from points 107 to 109 which exceeds the period from points 102 to 105, shown to be required for fueling one tank and balancing the system. The program begins at "Start" 260 with an immediate "Read Tank Level" 261 which is stored in memory register stack 208 as "Level 3". After "Delay $T_2$" 262, a period of time which may be 15 minutes or more, according to the application, a second "Read Tank Level" 263 is preformed and this reading is also stored in register stack 208 as "Level 3", moving the first stored reading to "Level 2". A second "Delay $T_2$" 264 and a third "Read Tank Level" 265, similarly stored as "Level 3" with the prior "Level 3" and "Level 2" moving to "Level 2" and "Level 1" respectively. Thus, a continuing three point plot of "Fuel Level vs. Time" is made available for evaluating changes of tank level over an extended period of time for indications of a refueling sequence and determination of the additive requirement. This is done by computation 266 which queries to see if there has been a tank level increase in excess of C/10 since the reading of "Level 1". If NO, the program loops back to "Delay $T_2$" 264 and continues, but if YES, a second query at computation 247 is made to see if the increase occurred between the readings of "Level 2" and "Level 1". If NO, the program again loops back to "Delay $T_2$" 264 and continues for another round. This assures that computation 268 will be made when "level 3" represents a reading made when refueling is complete and balanced. If YES, computation 268 is made to determine the amount of additive to be dispensed by "Additive Pump Sequence" 269. The program then returns to "Delay $T_2$" 264 and continues.

Figure 11:
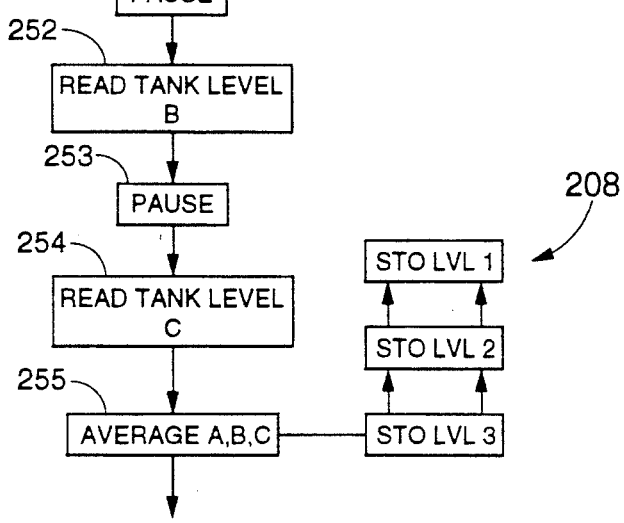
FIG. 11 is an alternate method for reading tank levels by averaging.

FIG. 11 shows a preferred method for performing "Read Tank Level" as required in the previously described logic sets in order to achieve a higher level of accuracy, especially in mobile applications. Rather than rely on a single reading an average of several readings is made over a brief period of time as shown beginning with "Read Level A" 250 followed by "Pause" 251 which may for any brief period such as five seconds. This is followed by "Read Level B" 252; "Pause" 253 for another five seconds and "Read Level C" 254. Then, Level A, Level B, and Level C are averaged to provide a final reading. The steps 250 through 255 are to be substituted for any "Read Tank Level" step in the previously described logic for enhanced reliability. This illustration contemplates three readings for an average but four, five or more may be taken in the same manner.

It is to be understood that the present invention is not limited to the disclosed embodiments and may be expressed by rearrangement or modification or substitution of parts or steps within the same spirit.

We claim:

1. A system for automatically dispensing additive to a motor vehicle fuel supply, independent of vehicle operation, so as to maintain a predetermined additive concentration in said fuel supply through a series of random fuel depletion and refueling cycles comprising:

refillable tank means for containing a fuel supply in a quantity measured by the level thereof;
a supply of additive for treatment of said fuel;
pumping means for transferring additive from said additive tank to said fuel supply at a fixed rate;
means for gradual fuel depletion of said fuel supply;
means for periodically sensing the level of said fuel supply;

means for comparing a current level and the two consecutive prior levels to establish a lowest level of said fuel supply and for recognizing a refueling and the amount of fuel added; and means for activating and controlling said pumping means when said fuel supply level is increased so as to transfer a quantity of additive proportional to said amount of fuel added.

2. An additive dispensing system in accordance with claim 1 wherein said means for identifying the lowest fuel level of said fuel supply further comprises means for recalling said lowest level.

3. An additive dispensing system in accordance with claim 1 wherein said means for recognizing a refueling further comprises means for identifying the completion thereof.

4. An additive dispensing system in accordance with claim 1 wherein each said periodically sensed level comprises an average of multiple levels sensed over a short period of time.

5. An additive dispensing system according to claim 1 wherein said means for comparing further comprises:

means for comparing the rate-of-change of fuel level over time to a predetermined characteristic rate-of-change.

6. An additive dispensing system system according to claim 1 wherein the means for comparing further comprises:

means for continuously storing the past two consecutive levels as the first, earlier level and the second level;

means for comparing the first level to the current level to detect any significant increase in level;

means for comparing the first level to said second level to establish the presence of a significant increase in level during that period; and means for comparing the first level to the current level to determine the total amount of fuel added.

7. A system for automatically dispensing additive to a motor vehicle fuel supply, independent of vehicle operation, so as to maintain a predetermined additive concentration in said fuel supply through a random series of fuel depletion and refueling cycles comprising:

refillable tanks wherein the fuel supply contained is measured by the level thereof;

an additive tank containing a supply of additive for treatment of said fuel;

pumping means for transferring additive from said additive tank to said fuel supply at a fixed rate;

means for gradual depletion of said fuel supply;

means for periodically sensing the level of said fuel supply;

means for comparing a current level and the two consecutive prior levels to establish a lowest level of said fuel supply and for recognizing a refueling and the amount of fuel added; and means for activating and controlling said pumping means when said fuel supply level is increased so as to transfer a quantity of additive proportional to said amount of fuel added.

8. An additive dispensing system in accordance with claim 7 wherein said means for identifying the lowest fuel level of said fuel supply further comprises means for recalling said lowest level.

9. An additive dispensing system in accordance with claim 7 and further comprising means for retaining substantially the lowest level of said fuel supply during the depletion thereof;

10. An additive dispensing system in accordance with claim 7 wherein said means for recognizing a refueling further comprises means for identifying the completion thereof.

11. An additive dispensing system in accordance with claim 7 wherein each said periodically sensed level comprises an average of multiple levels sensed over a short period of time.

12. An additive dispensing system according to claim 7 wherein said means for recognising a refueling further comprises means for comparing the rate-of-change of fuel level over time to a predetermined characteristic rate-of-change.

13. An additive dispensing system system according to claim 7 wherein the means for comparing further comprises:

means for continuously storing the past two consecutive levels as the first, earlier level and the second level;

means for comparing the first level to the current level to detect any significant increase in level;

means for comparing the first level to said second level to establish the presence of a significant increase in level during that period; and means for comparing the first level to the current level to determine the total amount of fuel added.

14. A method for evaluating a complete refueling event in an additive dispensing system for a vehicle, independent of the operation of the vehicle, comprising the steps of:

periodically measuring the fuel level at intervals known to at least approximate the time required for refueling and balancing fuel levels;

continuously storing the past two consecutive levels as the first, earlier level and the second level;

comparing the first level to the current level to detect any significant increase in level;

comparing the first level to said second level to establish the presence of a significant increase in level during that period; and comparing the first level to the current level to determine the total amount of fuel added in the refueling event.

* * * * *